United States Patent
Magnus

(10) Patent No.: US 10,907,710 B2
(45) Date of Patent: *Feb. 2, 2021

(54) STATIONARY STEERING WHEEL ASSEMBLY AND METHOD

(71) Applicant: Steering Solutions IP Holding Corporation, Saginaw, MI (US)

(72) Inventor: Brian J. Magnus, Frankenmuth, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/370,209

(22) Filed: Mar. 29, 2019

(65) Prior Publication Data

US 2019/0226561 A1 Jul. 25, 2019

Related U.S. Application Data

(63) Continuation of application No. 15/191,036, filed on Jun. 23, 2016, now Pat. No. 10,436,299.

(60) Provisional application No. 62/184,525, filed on Jun. 25, 2015.

(51) Int. Cl.

| | |
|---|---|
| *B62D 1/183* | (2006.01) |
| *B62D 1/18* | (2006.01) |
| *B62D 1/20* | (2006.01) |
| *B62D 1/184* | (2006.01) |
| *B60R 25/0215* | (2013.01) |
| *F16H 25/22* | (2006.01) |
| *B62D 1/181* | (2006.01) |
| *B60R 25/021* | (2013.01) |

(52) U.S. Cl.
CPC ........ *F16H 25/2204* (2013.01); *B62D 1/181* (2013.01); *B62D 1/183* (2013.01); *B60R 25/021* (2013.01); *B60R 25/0215* (2013.01)

(58) Field of Classification Search
CPC .......... B62D 1/18; B62D 1/181; B62D 1/183; B62D 1/184; B62D 1/185; B62D 1/20; B62D 1/286; B60R 25/0211; B60R 25/0215; B60R 25/02153
See application file for complete search history.

(56) References Cited

U.S. PATENT DOCUMENTS

| | | | |
|---|---|---|---|
| 10,385,930 B2 * | 8/2019 | Magnus | B62D 1/183 |
| 10,436,299 B2 * | 10/2019 | Magnus | F16H 25/2204 |

* cited by examiner

*Primary Examiner* — Barry Gooden, Jr.
(74) *Attorney, Agent, or Firm* — Dickinson Wright PLLC

(57) ABSTRACT

A steering shaft decoupling assembly includes a steering shaft. The assembly also includes a lower shaft mechanically coupled to the steering shaft. The assembly further includes a steering shaft locking component engageable with the steering shaft and moveable between a first position and a second position, the first position locking the steering shaft to prevent axial translation and the second position unlocking the steering shaft to allow axial translation of the steering shaft, the steering shaft locking component being in the second position in an autonomous driving mode, the autonomous driving mode comprising an advanced driving assist system controlling road wheels of a vehicle resulting in rotation of the lower shaft.

7 Claims, 2 Drawing Sheets

STATIONARY STEERING WHEEL ASSEMBLY AND METHOD

CROSS REFERENCE TO RELATED APPLICATIONS

This patent application claims priority to U.S. patent application Ser. No. 15/191,036, filed Jun. 23, 2016, which claims priority to U.S. Provisional Patent Application Ser. No. 62/184,525, filed Jun. 25, 2015, the disclosures of which are incorporated herein by reference in their entireties.

BACKGROUND OF THE INVENTION

The embodiments described herein relate to steering wheel assemblies and, more particularly, to a stationary steering wheel assembly, as well as methods associated with controlling the stationary steering wheel assembly.

As autonomously driven vehicles are developed, a number of opportunities will evolve related to comfort, entertainment and functionality for drivers. Steering wheels are commonly limited to standard driving positions due to the need for a driver to handle the steering wheel during operation of the vehicle. These limitations may be unnecessary during an autonomous driving mode of a vehicle.

SUMMARY OF THE INVENTION

According to one aspect of the disclosure, a steering shaft decoupling assembly includes a steering shaft. The assembly also includes a lower shaft mechanically coupled to the steering shaft. The assembly further includes a steering shaft locking component engageable with the steering shaft and moveable between a first position and a second position, the first position locking the steering shaft to prevent axial translation and the second position unlocking the steering shaft to allow axial translation of the steering shaft, the steering shaft locking component being in the second position in an autonomous driving mode, the autonomous driving mode comprising an advanced driving assist system controlling road wheels of a vehicle resulting in rotation of the lower shaft.

According to another aspect of the disclosure, a method of controlling a steering shaft decoupling assembly of an autonomous vehicle is provided. The method includes engaging a steering shaft locking component with a steering shaft in a standard driving mode to prevent translation of the steering shaft and to allow rotation of the steering shaft upon rotation of a lower shaft that the steering shaft is mechanically coupled to in the standard driving mode and the autonomous driving mode. The method also includes disengaging the steering shaft locking component from the steering shaft in the autonomous driving mode to allow translation of the steering shaft and to prevent rotation of the steering shaft in response to rotation of road wheels controlled by an autonomous driving assist system in the autonomous driving mode.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
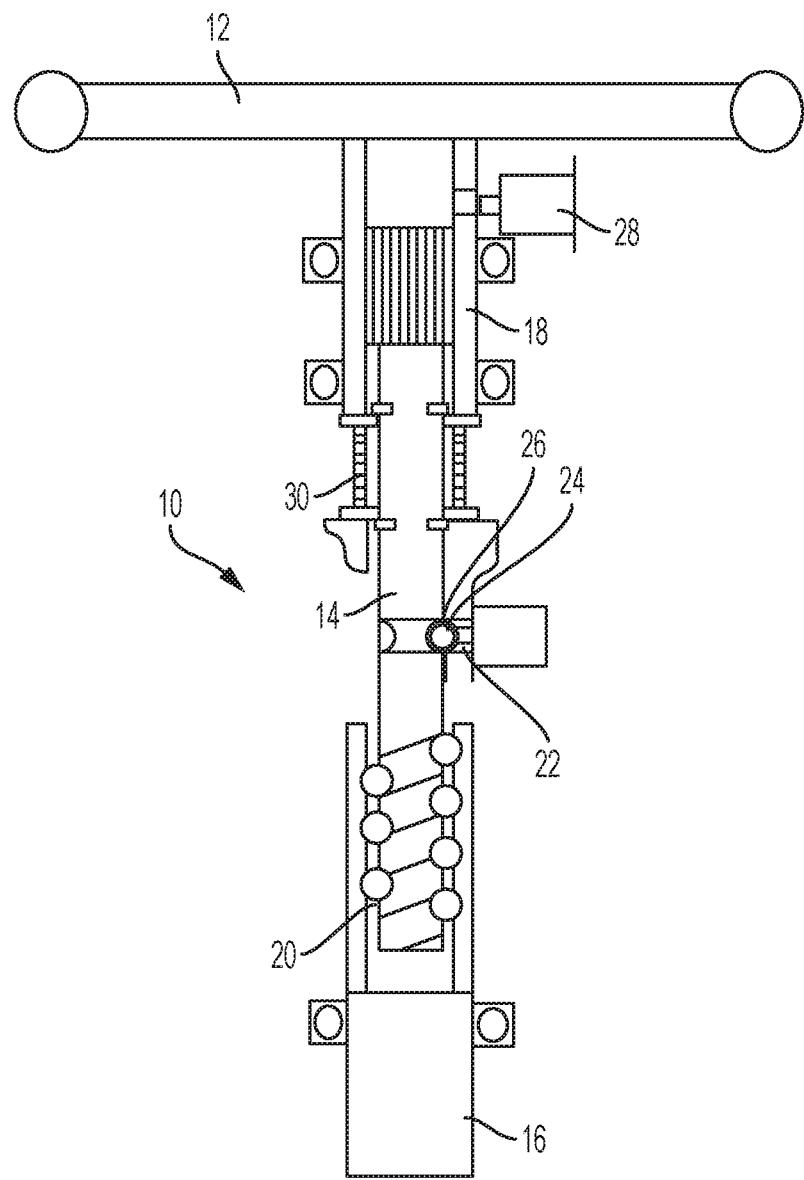
FIG. 1 is schematic illustration of a retractable steering column assembly.

Referring now to the Figures, where the invention will be described with reference to specific embodiments, without limiting same, FIG. 1 illustrates a stationary steering wheel assembly 10. The stationary steering wheel assembly 10 facilitates translation of a steering wheel 12 and a steering shaft 14 in a retractable manner. The stationary steering wheel assembly 10 also facilitates decoupling the steering wheel 12 from the steering shaft 14 to maintain the steering wheel 12 in a stationary (i.e., non-rotational) condition. These features are provided while maintaining a mechanical link between the road wheels of a vehicle and the steering wheel 12. This is particularly beneficial in embodiment where the assembly 10 is employed in a passenger vehicle equipped with Advanced Driver Assist System(s) to allow the vehicle to be autonomously controlled using sensing, steering, and/or braking technology. When the ADAS system is activated, the steering wheel is not required for vehicle control. Retraction of the steering wheel 12 and steering shaft 14 toward, and possibly into, the instrument panel greatly enhances user comfort by providing a driver with more space. The additional space provided facilitates additional workspace area or leg room, for example.

The embodiments described herein provide a retractable steering wheel while the vehicle is in an autonomous, or partially autonomous, driving mode. The operating conditions described herein for the steering wheel are standard driving mode, autonomous driving mode, and a transition mode therebetween.

In the standard driving mode, the steering wheel assembly 10 is extended to a location that is comfortably reached by a driver in a manner that allows the driver to fully handle and control the steering wheel. In this extended position, the steering wheel 12 is coupled to the steering shaft 14 and the steering shaft 14 is coupled to a lower shaft 16. The lower shaft 16 is operatively coupled to additional steering components that control the road wheels of the vehicle, thereby allowing the driver to control the road wheels in the standard driving mode.

Figure 2:
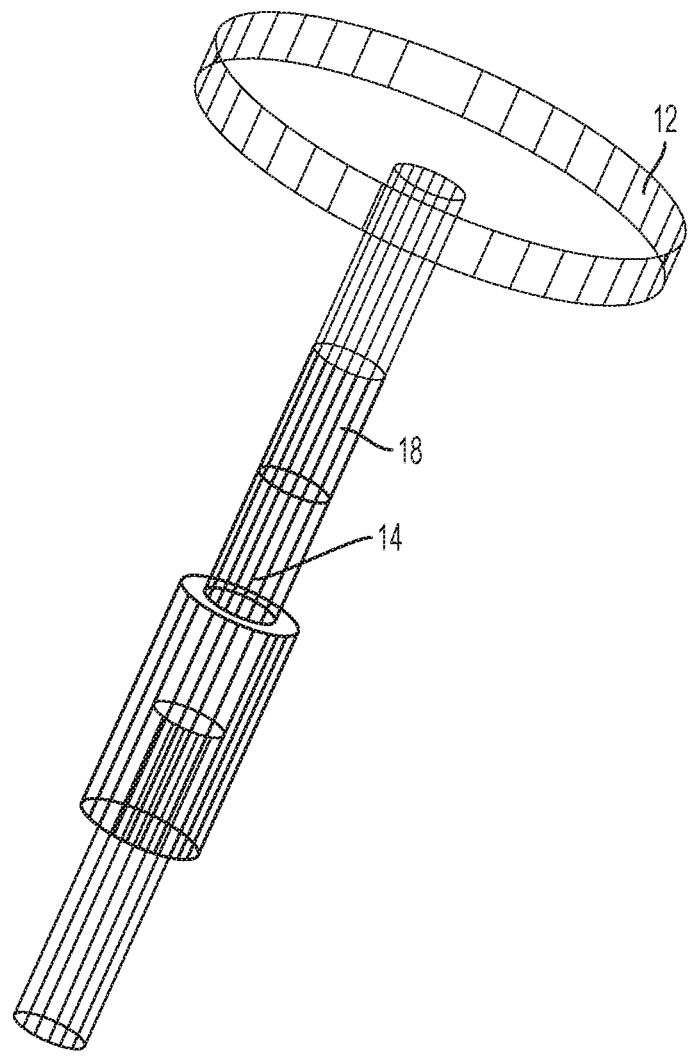
FIG. 2 is a perspective view of the retractable steering column assembly.

The steering wheel 12 coupling to the steering shaft 14 is made, at least in part, with a splined relationship and/or a groove-roller arrangement at location 18 (FIGS. 1 and 2). The steering shaft 14 is coupled to the lower shaft 16 with a ball screw 20. A steering shaft locking component 22 is extended in the standard driving mode to radially force an engagement member 24, such as a rolling ball, into an engagement feature 26 (also referred to herein as a receptacle) on the steering shaft 14, such as a groove dimensioned to at least partially receive the engagement member 24. In some embodiments, the steering shaft locking component 22 is a solenoid. Engagement of the engagement member 24 and the engagement feature 26 prevents the steering shaft 14 from translating and only allows rotation thereof. Torque and position from the driver are transmitted from the steering wheel 12 to the steering shaft 14 through the spline interface 18 described above and from the steering shaft 14 to the lower shaft 16 through balls and tracks of the ball screw 20. The lower shaft 16 is attached to a rack assisted electronic positioning system (EPS) that steers the road wheels. Feedback from the road wheels to the driver is transmitted in the reverse fashion.

During the autonomous driving mode, the driver will activate the ADAS system through some vehicle interface such as a switch or button. Upon activation, a steering wheel locking component 28 locks the steering wheel 12 from rotating by moving between a first position and a second position. In some embodiments, the first position and the second position are radial positions, such that radial engagement is facilitated by the steering wheel locking component 28. As a matter of safety and visual feedback, in some embodiments the retracted steering wheel remains stationary while the vehicle is in the autonomous driving mode. One way to accomplish the stationary steering wheel function while still maintaining a mechanical link to the road wheel steering system is to incorporate a differential gear in the steering linkage system, as described below.

In some embodiments, the steering wheel locking component 28 is a solenoid (FIG. 1) that extends and retracts for rotationally locking and unlocking the steering wheel 12 by radially engaging and disengaging a ball or the like 42 with the steering wheel 12.

A separate actuation system (not shown) that is not part of the column and wheel locking mechanisms at least partially retracts the steering wheel assembly 10 into the instrument panel of the vehicle. The rack EPS system steers the vehicle according to the ADAS system commands while the driver provides no steering inputs. As the rack EPS system moves the road wheels, the lower 16 shaft is rotated. When the lower 16 shaft rotates, the ball screw 20 forces the steering shaft 14 to translate in the upper spline 18 since the steering wheel 12 is fixed. As the steering shaft 14 translates, a centering spring pack 30 is compressed one way or the other depending on the direction of rotation of the lower shaft 16.

When the driver wants to transition back to the standard driving mode, the ADAS system is deactivated. Upon deactivation, the steering shaft locking component 22 is extended forcing the ball to the steering shaft 14. The centering spring 30, along with the rack EPS actuator, will provide force to direct the steering shaft 14 back to a center axial position. When the center position is achieved, the ball is forced into the track and the steering shaft 14 is locked axially. At this point, the ADAS system is informed through sensing that the steering wheel 12 is ready to be handed back to the driver. The steering wheel locking component 28 is released to allow rotation of the steering wheel and the separate actuation system extends the steering wheel assembly 10 back to the driver's preferred position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering shaft decoupling assembly comprising: a steering shaft;
a lower shaft mechanically coupled to the steering shaft;
a steering shaft locking component engageable with the steering shaft and moveable between a first position and a second position, the first position locking the steering shaft to prevent axial translation and the second position unlocking the steering shaft to allow the axial translation of the steering shaft, the steering shaft locking component being in the second position in an autonomous driving mode, the autonomous driving mode comprising an advanced driving assist system controlling road wheels of a vehicle resulting in rotation of the lower shaft, wherein the steering shaft is mechanically coupled to the lower shaft with a ball screw.

2. The steering shaft decoupling assembly of claim 1, wherein the steering shaft remains mechanically coupled to the lower shaft in the autonomous driving mode.

3. The steering shaft decoupling assembly of claim 1, wherein the steering shaft locking component comprises a solenoid.

4. The steering shaft decoupling assembly of claim 1, wherein the steering shaft locking component is in the first position in a standard driving mode.

5. The steering shaft decoupling assembly of claim 4, wherein the steering shaft rotates when the steering shaft locking component is in the first position.

6. The steering shaft decoupling assembly of claim 1, wherein the ball screw coupling allows the steering shaft to translate along the longitudinal axis of the steering shaft in response to rotation of the lower shaft in the autonomous driving mode.

7. The steering shaft decoupling assembly of claim 6, further comprising a spring pack in operative contact with the steering shaft to bias the steering shaft toward an axial center position to align the steering shaft locking component and a receptacle dimensioned to receive the steering shaft locking component in the first position of the steering shaft locking component.

* * * * *